(12) United States Patent
Hatch et al.

(10) Patent No.: US 12,417,251 B2
(45) Date of Patent: Sep. 16, 2025

(54) AUGMENTED FOLLOW PROBABILITY FOR SOCIAL NETWORKING SYSTEM FOLLOW RECOMMENDATIONS

(71) Applicant: Microsoft Technology Licensing, LLC, Redmond, WA (US)

(72) Inventors: Andrew O. Hatch, Berkeley, CA (US); Yan Wang, San Jose, CA (US); Keqing Liang, Cupertino, CA (US); Da Xu, Sunnyvale, CA (US); Bixing Yan, Santa Clara, CA (US); Haohua Wan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/426,335

(22) Filed: Jan. 29, 2024

(65) Prior Publication Data
US 2025/0245279 A1    Jul. 31, 2025

(51) Int. Cl.
*G06F 16/9536*    (2019.01)
(52) U.S. Cl.
CPC ................ *G06F 16/9536* (2019.01)
(58) Field of Classification Search
CPC .................................................. G06F 16/9536
See application file for complete search history.

(56) References Cited

U.S. PATENT DOCUMENTS

| | | | |
|---|---|---|---|
| 2018/0060749 A1* | 3/2018 | Yan ...................... | G06Q 50/01 |
| 2019/0114362 A1* | 4/2019 | Subbian ............. | G06F 16/9535 |
| 2019/0114373 A1* | 4/2019 | Subbian ............. | G06F 16/9536 |
| 2020/0183997 A1* | 6/2020 | Wang .................... | H04L 51/52 |
| 2021/0232942 A1* | 7/2021 | Lo ......................... | G06N 20/00 |
| 2021/0248687 A1* | 8/2021 | Albert ................. | H04L 67/306 |

* cited by examiner

*Primary Examiner* — Courtney Harmon
(74) *Attorney, Agent, or Firm* — Nicholson De Vos Webster & Elliott LLP

(57) ABSTRACT

Techniques for a social networking system involve analyzing members' interactions to enhance follow recommendations. The techniques include calculating the number of follows generated by a first member and the number of follows received by a second and third member. The platform then computes a weighted follow utility score for two member pairs: the first comprising the first and second members, and the second comprising the first and third members. These scores are determined by equally weighing the follows generated and received, along with a probability of the first member following the second or third member. While the probability suggests a preference for the second member, the ranking system places the third member pair higher. Consequently, the first member is advised to follow the third member, based on this ranking. Finally, this recommendation is displayed to the first member on an electronic device, guiding their social interactions on the platform.

18 Claims, 6 Drawing Sheets

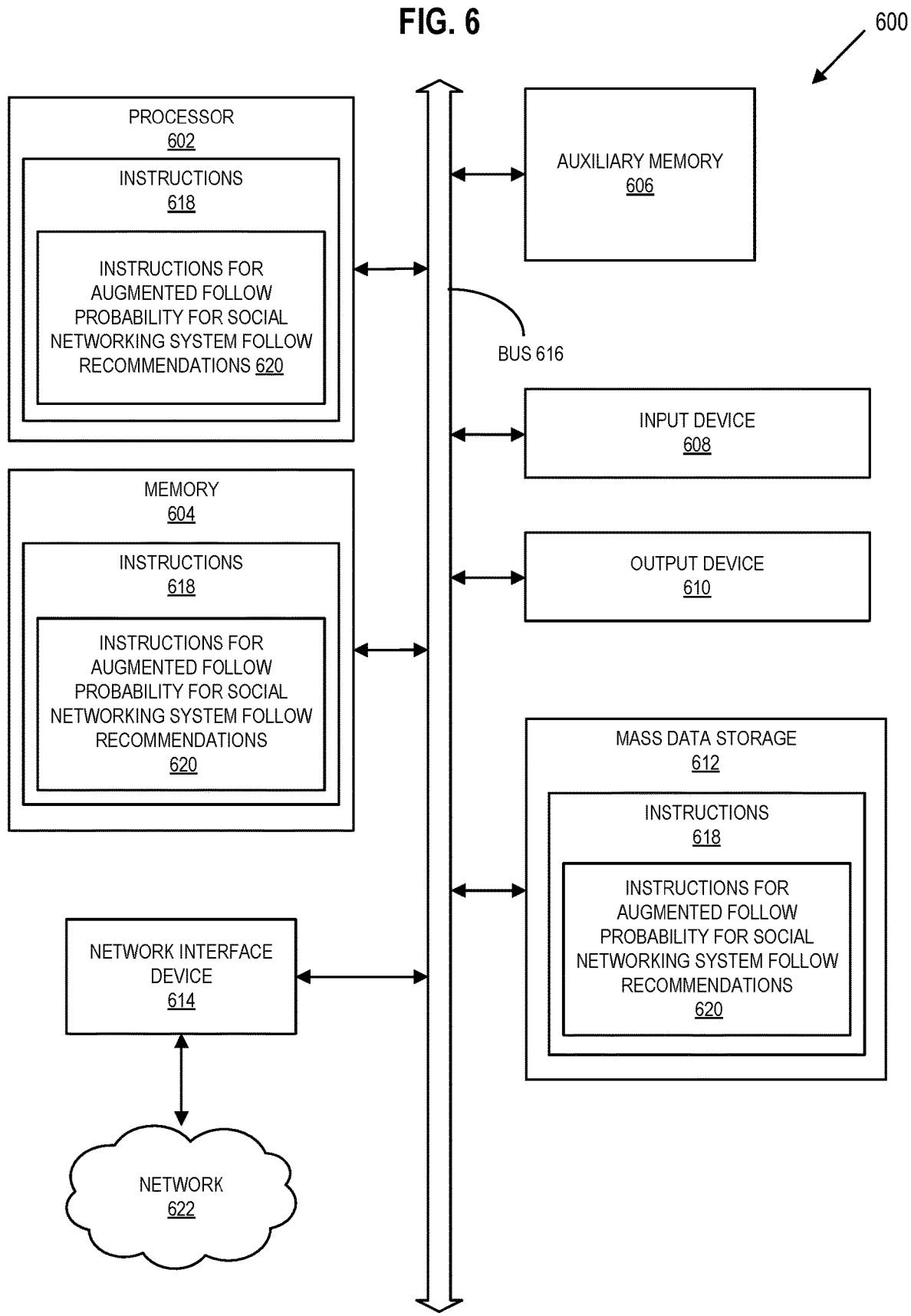

AUGMENTED FOLLOW PROBABILITY FOR SOCIAL NETWORKING SYSTEM FOLLOW RECOMMENDATIONS

BACKGROUND

A "social networking system" is an online service that enables users to create public profiles, connect with others, and share information. There are various types of social networking systems. One type focuses on personal interaction, socializing, and sharing with friends, family, and acquaintances, often referred to as a "social network." Social networks serve a variety of purposes such as entertainment, keeping in touch with friends and family, and sharing life updates.

Another type of social networking system is tailored for professional use, commonly known as a "professional network." These networks are used for career networking, professional branding, job searching, and sharing work-related information.

Both types of social networking systems facilitate the creation and maintenance of online communities and networks of people. Despite their different focuses, the core function of connecting people and enabling the exchange of information is a common feature across both types.

The implementation of a social networking system may encompass a "follows network." A follows network refers to a specific type of digital social structure where the connections between users are based on either a one-way follow system or mutual connections, or possibly both. In a one-way follow system, a user can choose to follow another user, which allows them to see the followed user's posts, updates, or content in their own feed. This action is unilateral, meaning the followed user does not need to follow back for the original user to see their content. On the other hand, mutual connections represent a reciprocal and mutually acknowledged relationship between users. Unlike the one-way follow system, mutual connections require both parties to agree to connect. Once a mutual connection is established, both users gain access to each other's shared content and updates and can often engage in more private forms of communication, such as direct messaging.

In social networking systems that accommodate either one-way follow systems or mutual connections, the process of establishing a connection, be it unilateral or mutual, typically begins with a connection request initiated by one user to another. In a one-way follow system, this request is straightforward and unilateral; a user simply chooses to follow another user. This action does not require the consent or acknowledgment of the user being followed. The follower immediately starts receiving updates from the followed user in their feed, but the reverse is not true unless the followed user independently decides to follow back. In contrast, establishing a mutual connection is more interactive. One user sends a connection request (such as a friend request), and the other user must actively accept it for the connection to be established. Only upon acceptance do both users gain access to each other's content, updates, and more private communication channels, like direct messaging. This dual system within the same platform allows users to curate their network based on their interaction preferences, whether they seek an asymmetrical relationship for content consumption or a reciprocal relationship for personal interactions.

Many social networking systems incorporate recommendation algorithms to suggest users that an individual might be interested in following. These recommendations are typically based on a variety of factors designed to enhance user engagement and network expansion.

BRIEF DESCRIPTION OF THE DRAWINGS

The following detailed description of certain embodiments of the invention may be understood by reference to the following figures:

FIG. 6 illustrates an example of a programmable electronic device that processes and manipulates data to perform tasks and calculations disclosed herein for augmented follow probability for social networking system follow recommendations.

DETAILED DESCRIPTION

Figure 1:
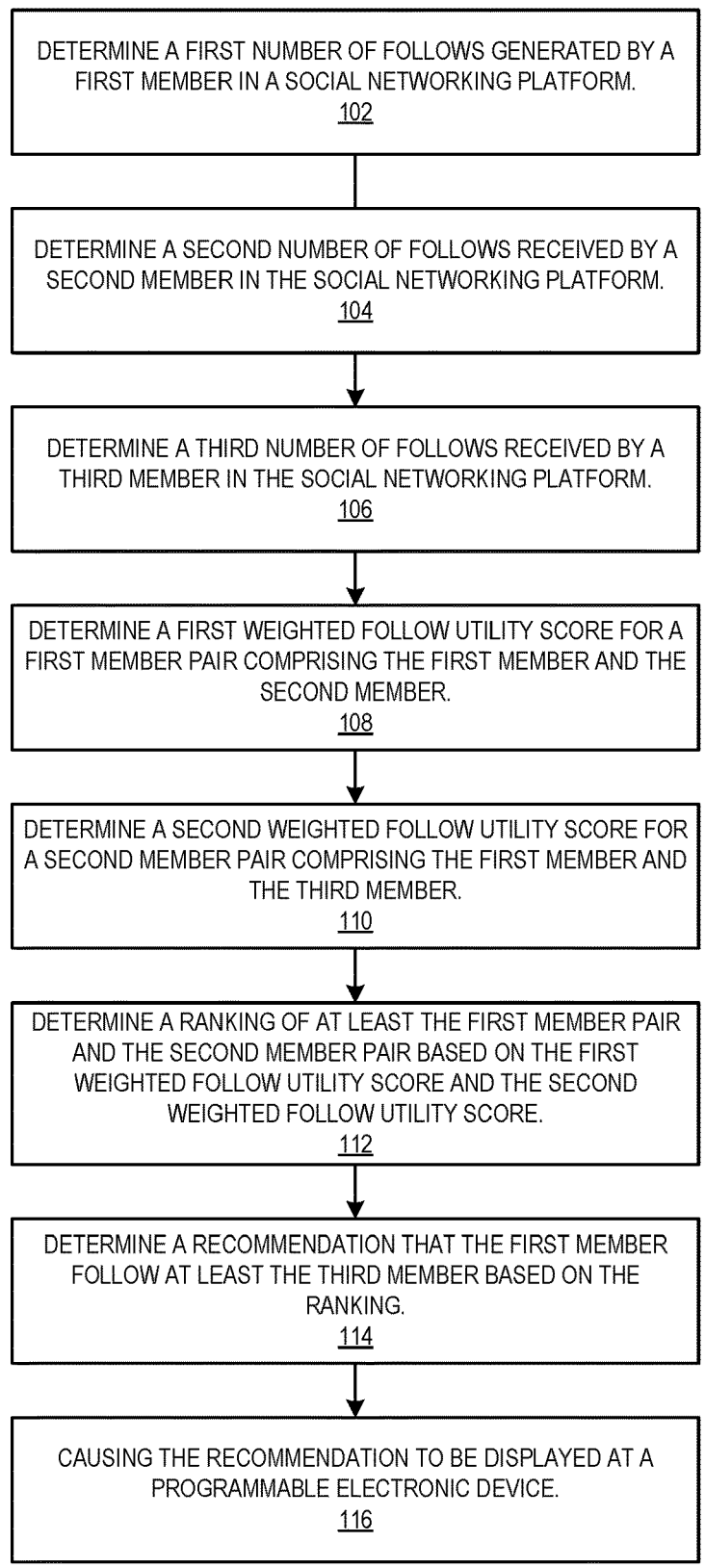
FIG. 1 depicts an example process for augmented follow probability for social networking system follow recommendations.

Systems, methods, and non-transitory computer-readable media (collectively referred to as 'techniques') are disclosed for augmented follow probability in social networking system follow recommendations. These techniques balance the dynamics between viewers and creators in follow recommendation algorithms used by social networking systems. The objective is to make follow recommendations of creators to viewers, utilizing a reciprocal function that penalizes the initially determined probability of a given viewer following a given creator. The penalty is proportionate to a number of follows generated by the viewer and a number of follows received by the creator. Consequently, if the creator has not received a large number of follows, they are more likely to be recommended to the viewer compared to a scenario where they had received more follows. Similarly, if the viewer has not followed a large number of creators, then the creator is more likely to be recommended to that viewer than if the viewer had been more active in following others. By doing so, highly-relevant tail creators are more likely to be recommended to selective viewers, thereby increasing the number of meaningful connections in the system's follows network.

The balance struck between viewers and creators in the follow recommendation algorithm used by a social networking system can affect the value members derive from using the platform. A 'member' may be defined as a user (e.g., an individual or an entity) of the social networking system who has registered and created a profile with the platform to engage with other members through sharing, communicating, and accessing content within an online community provided by the platform. A 'viewer' may be defined as a member of the social networking system to whom the platform recommends one or more creators to follow. A 'creator' may be defined as a member who is recommended, or is a candidate to be recommended, to the viewer to follow. A member can be both a viewer and a creator if the member is both (a) recommended or is a candidate to be recommended to another viewer as a creator to follow and (b) recommended one or more other creators to follow.

Considering how the follow recommendation algorithm used by the system can affect the value members derive from using the system, take a simple example involving a specific viewer V, a creator C-1 with many existing followers (e.g., millions), and a creator C-2 with relatively fewer existing followers, noting that viewer V is currently not following either creator C-1 or C-2. The algorithm's task may be to determine a respective score for each of the pairs (V, C-1) and (V, C-2), where these scores determine whether creator C-1 or C-2 should be recommended for viewer V to follow. For instance, the creator with the highest score may be recommended.

If the recommendation algorithm disproportionately favors the follow preferences of viewer V at the expense of the less popular creator C-2, then the overall follows network of the platform may be sub-optimal from the perspectives of viewer V, creator C-1, and creator C-2 alike. To illustrate, suppose viewer V is a large language model (LLM) engineer working on ethical artificial intelligence (AI), creator C-1 is the chief executive officer (CEO) of a well-known LLM-based artificial intelligence company, and creator C-2 is also an LLM engineer specializing in ethical AI. The recommendation algorithm might score the pair (V, C-1) higher than the pair (V, C-2), primarily because creator C-1, being a more popular creator with many followers, is deemed by the algorithm as more likely to be followed by viewer V compared to the less popular creator C-2.

However, while viewer V might indeed choose to follow creator C-1 if recommended, the added value to both viewer V and creator C-1 provided by the platform could be limited compared to if viewer V followed creator C-2. In becoming one of creator C-1's numerous followers, viewer V would likely contribute little to the already vast follower base of creator C-1. Consequently, creator C-1 (and consequently the follows network) might gain minimal long-term value from acquiring viewer V as an additional follower. In contrast, considering creator C-2's smaller follower base, a follow from viewer V could be much more significant for creator C-2. Furthermore, as creator C-2 acquires early followers on the platform, like viewer V, there might be a more noticeable increase in their content creation (e.g., posts) on the platform, in contrast to creator C-1, whose content creation rate may remain unchanged by adding viewer V as a follower.

Turning now to FIG. 1, it illustrates a process for augmented follow probability for social networking system follow recommendations. In summary, the process 100 proceeds by determining (102, 104, 106) the number of follows initiated by a first member and the follows received by a second and a third member. Utilizing these figures, the method determines (108, 110) weighted follow utility scores for two member pairs: the first pair consisting of the first and second members, and the second pair consisting of the first and third members. These scores are derived by equally weighting the follows generated by the first member and the follows received by the second and third members, combined with a calculated follow probability for each pair.

Notably, the follows probabilities indicate a higher likelihood of the first member following the second member over the third. Despite this, in the subsequent ranking process (112), the second member pair (involving the third member) is ranked higher than the first member pair. Based on this ranking, the first member is recommended (114) to follow at least the third member. This recommendation is then displayed (116) to the first member through a programmable electronic device, potentially influencing their social connections and interactions within the platform.

Returning to the top of FIG. 1, in the social networking system, determining (102) the first number of follows generated by a first member involves tracking and quantifying the first member's engagement in terms of their follow activity. Specifically, this process begins with the platform monitoring the actions of the first member, focusing on instances where they choose to follow other members or entities within the network. Each time the first member initiates a follow, the platform records this action. These instances are compiled over a specified period or continuously, depending on the platform's operational design and the objectives of the analysis. The total count of these follow actions constitutes the "first number of follows generated" by the first member.

To track and quantify the first member's engagement in terms of their follow activity on the social networking system, the platform employs a systematic process of data collection and analysis. This process begins with the platform continuously monitoring the user actions of the first member, particularly focusing on their interactions related to following other accounts or entities. Every instance where the first member initiates a follow—be it following another member, a group, a page, or any other followable entity on the platform—is logged by the system. These follow actions are recorded in real-time and stored in the platform's database.

Each of these actions is timestamped, allowing the platform to not only count the total number of follows but also analyze patterns over time, such as periods of increased or decreased activity. This data is then aggregated to represent a quantifiable measure of the first member's engagement through their follow activity. The total count of follows initiated by the first member gives a direct numerical value to their level of engagement.

In a one-way follow system on the social networking system, the first member initiates a follow by performing an action that signifies their interest in another member's content without requiring reciprocal action from the followed party. This process typically begins when the first member encounters a profile, page, or content they find interesting. On this profile or alongside the content, there is usually a clearly marked "Follow" button or icon. When the first member decides to engage with this entity, they click or tap this button. This action triggers a request to the platform's server, indicating the member's intention to follow the selected user or entity.

Upon receiving this request, the platform processes it by adding the followed account to the first member's list of followed entities. This addition is then reflected in the first member's user experience: they start receiving updates, posts, or content from the followed account in their feed or notification area. The one-way nature of this system means that the followed party docs not have to approve the follow request or follow back; the action is unilateral. The first member who initiated the follow can now stay updated with the activities, posts, or content of the entity they followed, enhancing their content consumption and engagement on the platform.

In a mutual connections system on the social networking system, initiating a follow involves a two-step process that requires reciprocal agreement from both parties. When the first member wishes to follow another member, they typically begin by locating the member's profile and clicking a "Connect" or "Add Friend" button, depending on the platform's terminology. This action sends a connection request to the intended member. Unlike a one-way follow system, this request must be acknowledged and accepted by the recipient for the connection to be established. Once the recipient receives the notification of the connection request, they have the option to either accept or decline it.

If the recipient accepts the request, a mutual connection is formed. This mutual connection typically allows both members to view each other's full profiles, shared content, and updates, depending on the privacy settings of the platform. In essence, both members have 'followed' each other, creating a two-way link that symbolizes a mutual acknowledgment or a more personal connection than a one-way follow.

The first number of follows generated by the first member on the social networking system can encompass both one-way follows and mutual connections, reflecting the different ways in which members can engage with others on the platform. In the context of one-way follows, this number includes each instance where the first member chooses to follow another user, page, or entity without necessitating a reciprocal action. Each of these follows is counted towards the first member's total follow activity. On the other hand, mutual connections are also included in this count, but they represent a more interactive form of engagement. In this scenario, the first member sends a connection request to another user, and this request must be accepted for the connection to be established. Once this mutual consent is achieved, this interaction is also added to the first member's total number of follows.

The first number of follows generated by the first member on the social networking system can be tailored to include only recent follow activity within a defined sliding time window, focusing on the first member's current engagement patterns. In this approach, the platform sets a specific timeframe, such as the past 30 days or any other chosen duration, and tracks the first member's follow actions within this period. This sliding time window moves forward with each passing day, continuously updating to encompass the most recent set of days. For instance, if a 30-day window is used, on any given day, the platform calculates the total number of follows initiated by the first member in the last 30 days from that date.

In the social networking system, determining (104) the second number of follows received by the second member involves tracking the incoming follow requests or connections that this second member accumulates over time. Specifically, this process is centered on quantifying the number of other members who have chosen to follow or connect with the second member. Each time another member on the platform clicks the "Follow" button on the second member's profile, page, or engages with any feature that signifies following or connecting, it is recorded as an incoming follow for the second member. The platform's system, through its server and databases, logs each of these instances, assigning them to the second member's account.

This aggregation of follows forms the "second number of follows received" by the second member. It is a useful metric for the platform as it reflects the second member's popularity, influence, or relevance within the network. This number can be a simple count of all follows received since the second member joined the platform, or it might be configured to reflect a more recent time frame, such as follows received in the last month or year, depending on the platform's analytical needs.

In a one-way follow system on the social networking system, the second member receives a follow through a straightforward, non-reciprocal process initiated by another member. When a member, interested in the content or profile of the second member, comes across their page, they can choose to follow them by clicking a "Follow" button typically visible on the second member's profile or near their content. This action is a unilateral decision, meaning the second member does not need to approve the follow request; it is automatically processed by the platform. Once the user clicks the follow button, the platform's system registers this action and adds the user to the list of followers of the second member.

This increase in the second member's followers is then reflected in their account metrics. The process is designed to be simple and immediate, encouraging users to effortlessly build a network of content they find interesting. For the second member, each new follow increases their follower count, which can be an important metric of popularity or influence on the platform. In the one-way follow system, the focus is on the case of content discovery and consumption, allowing members to curate their feed by following diverse accounts without requiring the consent or reciprocal engagement of those they choose to follow.

In a mutual connections system on the social networking system, the second member receives a follow through a process that requires mutual consent between both parties. Here, instead of a simple one-click follow, another member initiates the connection by sending a friend request or connection invitation to the second member. This invitation is typically done by clicking an "Add Friend" or "Connect" button on the second member's profile. Upon initiating this request, the second member receives a notification and can then review the requesting member's profile to decide whether to accept or decline the connection.

If the second member accepts the request, a mutual connection is established, signifying a two-way follow. This means both members can now see each other's posts, updates, or any shared content, depending on the platform's privacy settings. This mutual consent model is more interactive and personal compared to one-way follows. It is commonly used in platforms where connections are meant to reflect more personal or professional relationships. For the second member, each accepted connection increases their network, potentially leading to a richer, more engaging social experience on the platform. This system emphasizes the quality of connections over quantity, as each follow requires deliberate action and consent from both involved members.

The second number of follows received by the second member on the social networking system can encompass both one-way follows and mutual connections, reflecting the second member's popularity and engagement within the network through different interaction modes. In the case of one-way follows, this number includes each instance where other members independently choose to follow the second member's profile or content. These follows do not require reciprocal action from the second member and contribute to their follower count, indicating their reach and influence on the platform. On the other hand, mutual connections are also included in this count but represent a different form of interaction. These connections occur when both the second member and another member agree to connect, initiated by a friend or connection request.

Once the second member accepts such a request, it is counted as a mutual follow, signifying a two-way relationship. This type of follow is common in platforms where relationships have a more personal or professional nature. By combining both one-way follows and mutual connections, the total number of follows received by the second member provides a comprehensive measure of their social presence on the platform.

The second number of follows received by the second member on the social networking system can be specifically focused on recent follow activity within a defined sliding time window, offering a current snapshot of the second member's influence and engagement. In this approach, the platform sets a specific duration, such as the last 30 days or another predetermined period and tracks the number of new follows the second member has received within this timeframe. As time progresses, this window 'slides' forward, continuously updating to only include the most recent set of days. For example, if a 30-day window is utilized, on any given day, the platform calculates the number of new follows the second member has received in the past 30 days from that date.

This method of counting follows is particularly useful for understanding and responding to current trends and shifts in user behavior. It allows the platform to capture and reflect the recent popularity or visibility of the second member, which might be influenced by recent posts, activities, or changes in the platform's algorithms. Focusing on recent activity also means that the data remains relevant and timely, providing a dynamic view of the second member's social networking influence.

The social networking system determines (106) the third number of follows received by the third member in a manner similar to how it calculates the second number of follows for the second member, focusing on quantifying the incoming follow requests or connections. This process involves continuously monitoring and logging instances where another member on the platform decides to follow or connect with the third member. Each time a member engages with the "Follow" button on the third member's profile or content, the action is recorded by the platform's server and added to the third member's follow count. This count represents the total number of members who have shown an interest in the third member's content or profile by choosing to follow them.

Whether these follows are one-way, where no reciprocal action is required from the third member, or part of a mutual connection system requiring consent from both parties, each follow is counted towards the third member's total. The platform's system aggregates these instances to create a comprehensive measure of the third member's reach and influence within the network.

Just like with the second number of follows received by the second member, the third number of follows received by the third member on a social networking system can also be focused on recent activity within a defined sliding time window. This method involves setting a specific timeframe, such as the past 30 days or another chosen period, during which the platform tracks and counts the new follows the third member receives. As time progresses, this window moves forward, constantly updating to include only the most recent set of days. For instance, in a 30-day sliding window, the platform would tally the number of follows received by the third member in the last 30 days from the current date.

The social networking system determines (108) a first weighted follow utility score for a first member pair, which includes the first member as the viewer and the second member as a creator. The first weighted follow utility score is determined by equally weighting the first number of follows generated by the first member and the second number of follows received by the second member. Additionally, the first weighted follow utility score is also based on a first follow probability for the first member pair.

In some embodiments, the first weighted follow utility score is determined according to the following equation:

$$U_{vc} = \frac{1}{f(N_v, N_c)} Pr(f_{v \to c})$$

In the above equation, the result $U_{vc}$ represents the first weighted follow utility score for a viewer v and a creator c pair (e.g., the first member pair). The parameter $Pr(f_{v \to c})$ represents a follow probability for the (v, c) member pair (e.g., the first follow probability for the first member pair). And the parameter $$\frac{1}{f(N_v, N_c)}$$

represents a reciprocal function of a number of follows $N_v$ generated by the viewer v (e.g., the first number of follows generated by the first member) and a number of follows $N_c$ received by the creator c (e.g., the second number of follows received by the second member).

With $U_{vc}$, follows generated by viewers who rarely follow other members are more valuable and contain more information than follows generated by viewers who follow other members more often. Similarly, follows received by "tail" creators that have relatively fewer followers are more valuable and contain more information than follows received by large "head" creators that already have relatively more followers. For another perspective, $U_{vc}$ down weights the follow probability for the (v, c) member pair where the creator c is a large head creator or a more generic creator such as a public figure, celebrity, or well-known business, while upweighting the follow probability for the (v, c) member pair where the creator c is a smaller tail creator that has topical relevance to the viewer v (e.g., both viewer v and creator c are LLM engineers with a focus on ethical AI). Likewise, $U_{vc}$ down weights viewers who are less selective about the members they follow while upweighting $U_{vc}$ viewers who are more selective. Thus, $U_{vc}$ captures more information than other utility scores such as $Pr(f_{v \to c})$ alone, thereby improving follows recommendations that are based on $U_{vc}$. When viewers follow the creators recommended to them where the recommendations are based on $U_{vc}$, the overall follow network of the social networking system is enhanced, resulting in richer and more meaningful connections. This improvement occurs particularly between selective viewers and smaller, 'tail' creators who generate highly relevant or topical content for these viewers. Such valuable connections might not be established if larger, 'head' creators were recommended instead of these topically relevant smaller creators.

The social networking system can generate the follow probability $Pr(f_{v \to c})$ for a given viewer-creator pair (v, c) in various different ways. One way is to use machine learning. Machine learning can be effectively employed by the social networking system to generate the follow probability for the viewer-creator pair (v, c), which predicts the likelihood that the given viewer v will follow the given creator c. This is achieved by analyzing large datasets of members interactions and behaviors on the platform. The machine learning model is trained (e.g., in a supervised or semi-supervised fashion) on historical data that includes instances of viewers following creators. This training involves identifying patterns and correlations in the data, such as the types of content viewers interact with, the frequency of their interactions, their existing network, and profile information.

The machine learning algorithm learns from these patterns to understand the factors that influence a viewer's decision to follow a creator. For instance, it might recognize that viewers with certain interests or browsing habits are more likely to follow creators who consistently produce content in those areas. Once trained, the algorithm can then apply this learned knowledge to new, unseen data to predict follow probabilities for different viewer-creator pairs.

This predictive capability is refined continuously as the machine learning algorithm processes new user data, making the follow probability predictions more accurate over time. By doing so, the social networking system can offer more personalized and relevant creator recommendations to each viewer, thereby enhancing user experience and engagement on the platform.

In some embodiments, the follow probability $Pr(f_{v \to c})$ reflects an estimate of post-follows interactions between the viewer v and the creator c, in addition to reflecting a probability that the viewer v will follow creator c, if creator c is recommended as a follow to viewer v. The follow probability $Pr(f_{v \to c})$ for the given viewer v and creator c pair on the social networking system can be designed to incorporate an estimate of post-follow interaction between the viewer v and the creator c, providing a more nuanced and predictive understanding of the potential relationship. This estimation is built by analyzing historical interaction data between viewers and creators after a follow has been initiated. Machine learning algorithms can process this data to identify patterns of engagement, such as the frequency and type of interactions (likes, comments, shares) that typically occur between viewers and creators post-follow.

For instance, if historical data shows that viewers who follow creators with certain characteristics (like content type, posting frequency, or topic) tend to engage more actively with their content, the algorithm can use this information to predict the likelihood of similar engagement for new viewer-creator pairs. This involves not just predicting whether a viewer will follow a creator, but also forecasting the depth and nature of the ensuing interaction.

By incorporating this level of detail, the follow probability $Pr(f_{v \to c})$ becomes more than just a measure of whether the viewer v might hit the follow button for creator c; it becomes a predictor of the future relationship's quality and engagement level. This allows the platform to make more informed recommendations, not just based on the likelihood of a follow, but on the potential for meaningful and sustained interaction, thereby enhancing the overall user experience and engagement on the platform.

Returning to the above-equation for $U_{vc}$, the reciprocal function $$\frac{1}{f(N_v, N_c)}$$

may be viewed as a normalization or an augmentation of the follow probability $Pr(f_{v \to c})$ wherein the follow probability $Pr(f_{v \to c})$ optimizes for the viewer v and the reciprocal function $$\frac{1}{f(N_v, N_c)}$$

optimizes for the viewer and the creator equally. By normalizing/augmenting so when providing follow recommendations to members, the overall follows network of the social networking system becomes more balanced with respect to selective viewers and smaller but highly topical tail creators.

The social networking system determines (110) a second weighted follow utility score for a second member pair, which includes the first member as the viewer and the third member as a creator. The second weighted follow utility score is determined by equally weighting the first number of follows generated by the first member and the third number of follows received by the third member. Additionally, the second weighted follow utility score is also based on a second follow probability for the second member pair.

In some embodiments, the second weighted follow utility score is determined according to the above equation for $U_{vc}$ like the first weighted follow utility scores is determined but where the parameter $Pr(f_{v \to c})$ represents a follow probability for the second member pair. And the parameter $$\frac{1}{f(N_v, N_c)}$$

represents a reciprocal function of the first number of follows generated by the first member and the third number of follows received by the third member.

In the social networking system, the ranking (112) of member pairs, specifically the first and second member pairs, is determined based on their respective weighted follow utility scores. These scores, calculated for each pair, are a blend of quantitative follow data and qualitative probability estimations. For the first member pair, the score combines the number of follows generated by the first member with the number of follows received by the second member, each given equal weight. This score is further refined by incorporating a follow probability, which assesses the likelihood of the first member following the second. Similarly, the second member pair's score is calculated using the same approach, but with the follow data for the third member.

The social networking system then compares these weighted scores to rank the member pairs. The pair with a higher utility score is ranked above the other. This ranking is indicative of a more favorable or potentially beneficial connection based on the system's calculated metrics and probabilities. The higher ranking reflects a greater likelihood of meaningful interaction or content relevance between the members in the pair. By leveraging this data-driven approach, the system aims to optimize the network's connections, guiding members towards more engaging and relevant social interactions.

It should be noted that the relative ranking of the first and second member pairs may be different based on their follow probabilities $Pr(f_{v \to c})$ compared to the ranking based on their weighted follow utility scores $U_{vc}$. For example, the first follow probability for the first member pair and the second follow probability for the second member pair may indicate that the first member is more likely to follow the second member than the third member. However, the second member pair may be ranked higher than the first member pair according to their weighted follow utility scores.

Figure 2:
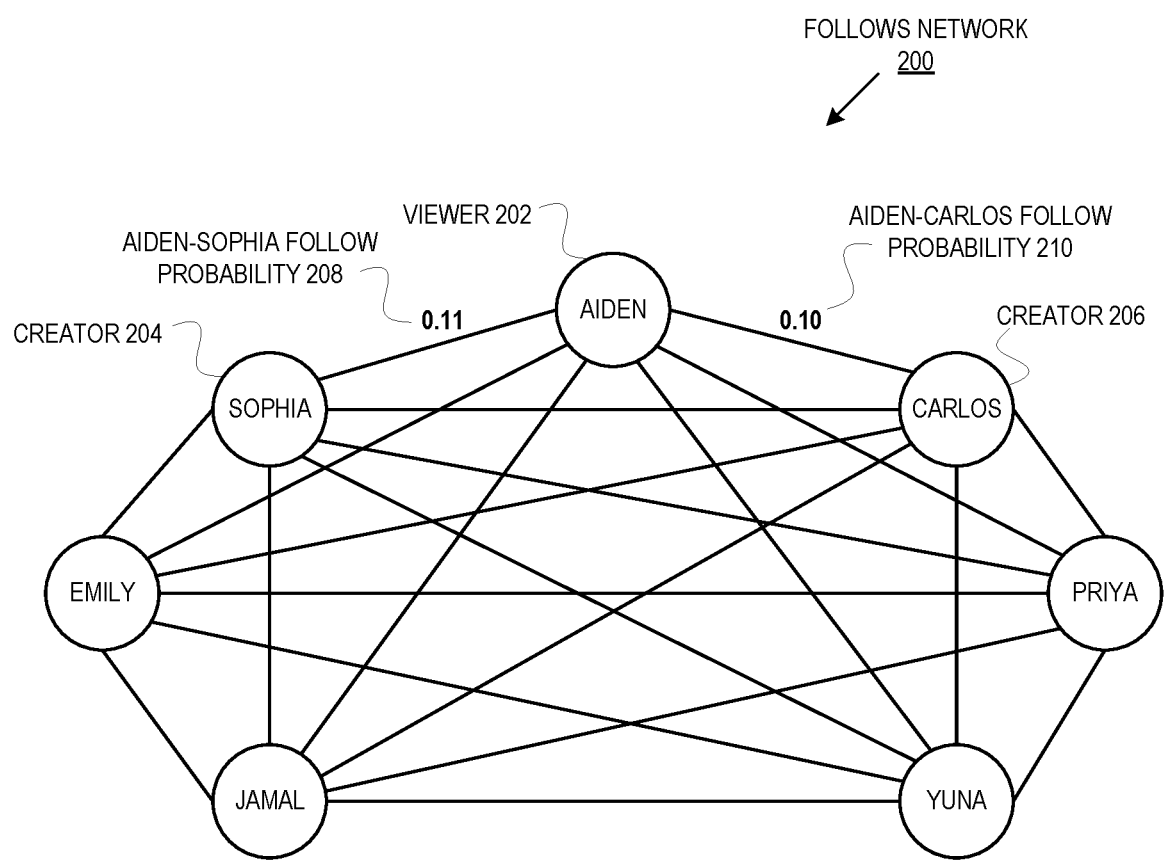
FIG. 2 illustrates an example of follows network with follow probabilities for viewer-creator pairs.

Consider the follows network 200 of FIG. 2. In this example, Aiden is the first member and viewer 202, Sophia is the second member and creator 204, and Carlos is the third member and creator 206. The Aiden-Sophia follow probability 208 and the Aiden-Carlos follow probability 210 indicates that Aiden is slightly more likely to follow Sophia than Carlos. If only one Sophia and Carlos is recommended as a follow to Aiden, then the social networking system might choose to recommend Sophia over Carlos based on their respective follow probabilities 208 and 210.

Figure 3:
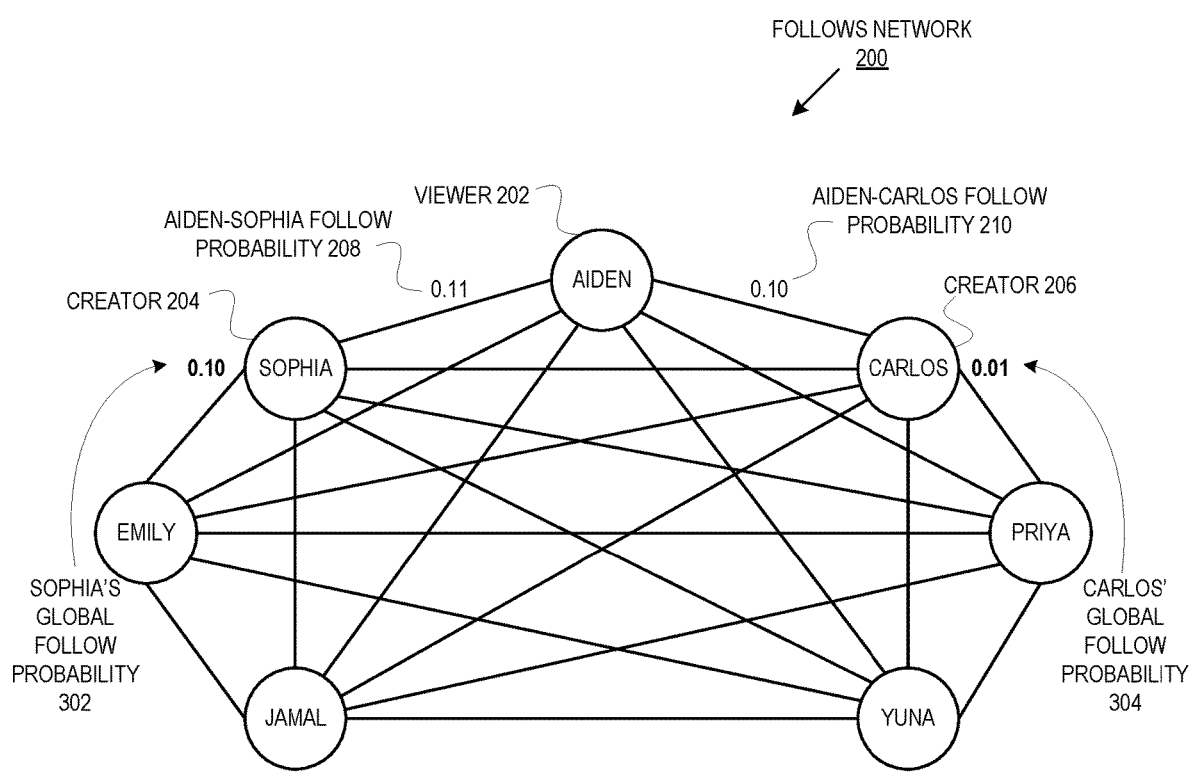
FIG. 3 illustrates the follow network of FIG. 2 with the additional of global follow probabilities for the creators.

However, referring now to FIG. 3, what if Sophia is a larger head creator and Carlos is a smaller tail creator. In this case, Sophia might have a global probability 302 of being followed by any member generally and not Aiden in particular that is, for example, 10 times the global probability 304 of Carlos being followed by any member generally and not Aiden in particular. This may change which of Sophia or Carlos should be recommended to Aiden to follow.

The follow probabilities 208 and 210 alone favor the preferences of Aiden at the expense of Carlos, a smaller tail creator. This hurts Carlos, Aiden, and the overall follows network because an opportunity to establish a more meaningful connection between Aiden and Carlos is missed.

Two-Way Matching Approach

In this section, the theory supporting the derivation of above-equation for $U_{vc}$ is described.

The above problem of capturing both viewer and creator preferences in a more balanced way is addressed by using a two-way matching approach. In this approach, viewers select creators they want to follow, and creators implicitly select viewers they want to be recommended to. To ensure that all viewers and creators are weighted equally, every creator implicitly chooses one viewer to be recommended to and every viewer chooses one creator to follow.

Given that every viewer must choose one creator to follow, the probability that viewer v will choose creator c is the probability that viewer v followed creator c, given that viewer v followed some creator. Conversely, given that every creator must choose one viewer to be recommended to, the probability that creator c will choose viewer v is the probability that creator c was followed by viewer v, given that creator c was followed by some viewer.

With this, the followed objective function Q represents the two-way matching approach where creator c chose to be recommended to viewer v and viewer v followed creator c:

$$Q = \Sigma_v \Sigma_c 1_{c \to v} \cdot 1_{v \to c}$$

As a practical matter, creators do not explicitly "choose" which viewers they want to recommend to. Hence, direct observation of $1_{c \to v}$ by the social networking system is not practical. However, the expected value of the objective function Q can be used in place of direct observation, as in the following expected value E[Q] of the objective function Q:

$$E[Q] = \Sigma_v \Sigma_c Pr(v|c,f) \cdot Pr(c|v,f)$$

In the above equation, the parameter Pr(v|c, f) represent the probability that creator c chooses to be recommended to viewer v given that creator c must choose one viewer v under the two-way matching framework. The parameter Pr(c|v, f) represents the probability that viewer v follows creator c given that viewer v must choose one creator c under the two-way matching framework.

From the expected value E[Q] of the objective function Q, the following scoring function, inspired by the second variant of the pointwise mutual information (PMI) scoring function (otherwise known as the positive PMI function), optimizes for both viewers and creators and weights both equally.

$$E[Q] = \Sigma_v \Sigma_c \frac{Pr(v, c|f)^2}{Pr(v|f)Pr(c|f)}$$

In the above scoring function, the parameter Pr(v, c|f) represents the joint probability that (a) creator c chooses to be recommended to viewer v given that creator c must choose one viewer v and (b) viewer v follows creator c given that viewer v must choose one creator. The parameter Pr(v|f) represents the probability that viewer v follows any member (e.g., represents how selective viewer v is in following creators) and the parameter Pr(v|f) represents the global follow probability of creator c (e.g., represents how probable creator c is a larger head creator or a smaller tail creator).

Using Jepsen's inequality to remove the squared numerator and using estimates for the probabilities, the following objective function results that provides an estimate of the utility of creator c being recommended to viewer v:

$$U_{vc} = \Sigma_v \Sigma_c \frac{N_{vc}}{\sqrt{N_v N_c}} \cdot Pr(f_{v \to c})$$

In the above objective function, the parameter $N_v$ represents a number of follows generated by viewer v, the parameter $N_c$ represents a number of follows received by creator c, and the parameter $N_{vc}$ represents the number of times viewer v followed creator c which, for follows, can be limited to 1. Thus, the final objective function is:

$$U_{vc} = \frac{1}{\sqrt{N_v N_c}} \cdot Pr(f_{v \to c})$$

The above objective function for determining (e.g., in step 108 or 110 of process 110) the weighted follow utility score for a given (viewer v, creator c) pair represents the inverse of the geometric mean of the number of follows generated by viewer v (e.g., as determined in step 102 of process 100) and the number of follows received by creator c (e.g., as determined step 104 or 106 of process 100) multiplied by the follow probability for the (v, c) pair.

The intuition underlying $U_{vc}$, as mentioned above, is that follows generated by viewers who rarely follow other members are more valuable to the follows network and contain more information than follows generated by viewers who follow other members all the time. Similarly, follows received by tail creators are more valuable to the follows network and contain more information than follows received by large head creators such as public figures, celebrities, influencers, or other widely known members.

Returning now to FIG. 1, in the social networking system, the process of determining (114) a recommendation for the first member to follow at least the third member is based on the platform determining (at steps 108 and 110) the first and second weighted follows utility scores for the first and second member pairs, in this case, the first member with the second member (first pair) and the first member with the third member (second pair). These scores are based on factors like the number of follows generated and received by these members and the likelihood or probability of the first member following the other members.

The system then ranks (112) these member pairs based on their determined (108, 110) weighted follow utility scores.

The pair with a higher utility score is deemed to have a stronger potential connection or relevance to the first member. In this scenario, if the pair involving the third member (first member and third member) receives a higher score than the pair with the second member, it implies that the relationship or interaction between the first and third members is likely to be more engaging or relevant according to the platform's algorithms.

Based on this ranking, the system determines (114) a recommendation for the first member. This recommendation suggests that the first member should consider following the third member, as the analysis indicates a higher value or potential for engagement in this connection. The recommendation is then conveyed to the first member, through the platform's user interface, such as a notification or a special section for follow recommendations. This process is designed to enhance the user experience by guiding members towards making connections that are more likely to be meaningful and engaging based on their past behavior and preferences.

The social networking system employs a process to display (116) follow recommendations, such as suggesting that the first member follow the third member, on the first member's programmable electronic device. This process starts with the recommendation being determined (114) by the platform's server, based on the previously determined (108, 110, and 112) rankings and weighted follow utility scores of member pairs. Once the recommendation is determined (114), it is transmitted (116) over the internet or other data network to the first member's device, which could be a smartphone, tablet, or computer, for example.

The device, running the social networking application or accessing its web interface, receives this data and processes it within the app's framework. This processing includes integrating the recommendation into the user interface, ensuring that it appears in an appropriate and noticeable section of the app or website, such as a dedicated recommendations area, a notification, or a pop-up. The design and timing of this display are often optimized based on user engagement patterns to maximize visibility and relevance.

Moreover, this process can be dynamic and responsive to real-time user interactions. If the first member is actively using the platform when the recommendation is ready, it may appear almost immediately. If not, it might be queued as a notification for when they next access the platform. The goal is to seamlessly integrate these recommendations into the user experience, making them both timely and contextually relevant, thereby enhancing engagement on the social networking system.

Machine Learning Training Application

Figure 4:
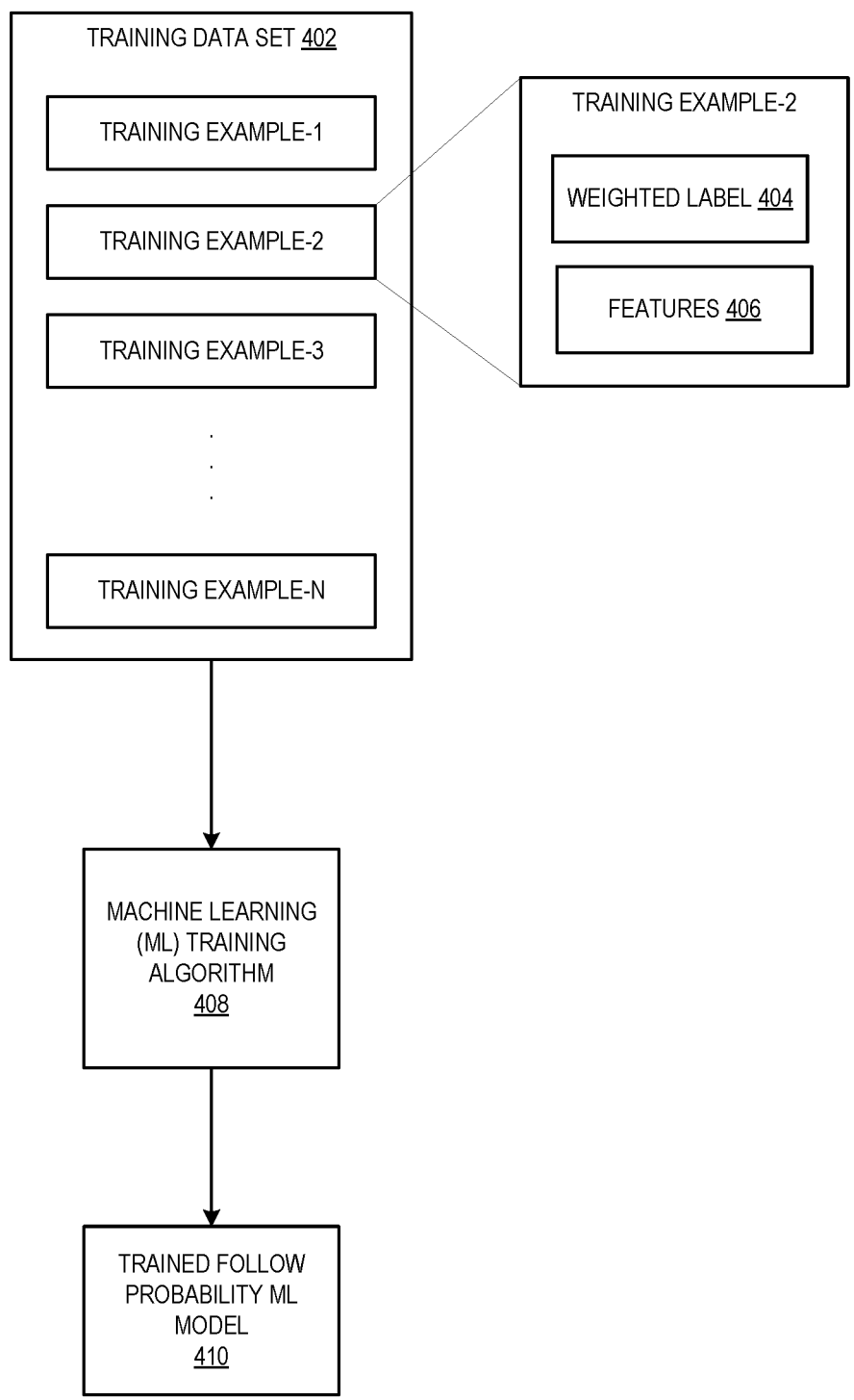
FIG. 4 illustrates an example of training a follow probability machine learning model based on a training data set in which the labels of training examples contain augmented follow probabilities.

Referring now to FIG. 4, in some embodiments, in addition to or as an alternative to improving follow recommendations as described above, a follow probability machine learning model is trained based on a training data set to improve topical relevance. In particular, a training data set 402 comprises training examples where each training example comprises a weighted label 404 and a set of features 406. Each training example of the training data set 402 represents a corresponding viewer v and creator c pair. The features 406 of the training example may represent features of the corresponding viewer v and the creator c, in addition to possibly other features. For example, the features 406 may encompass data that numerically, categorically, or using embeddings represent any of all of the following features about the viewer v and the creator c:

(1) Historical interaction features such as the number of times the viewer v has interacted with the creator c's content, such as likes, comments, shares, or previous follows.

(2) Content similarity features representing the degree of similarity between the content posted by the creator c and the content typically consumed or interacted with by the viewer v. This could be assessed using techniques like natural language processing for textual content or image analysis for visual content.

(3) Follow pattern features for viewer v acquired by analyzing the viewer v's history of follows can provide insights into their preferences. This might include the types of creators they follow, the frequency of new follows, and the longevity of these follow relationships.

(4) Popularity metrics for creator c including the total number of followers, the rate of growth in followers, and the level of engagement the creator's content receives (likes, comments, shares).

(5) Temporal dynamics such as time-related patterns in the viewer v's and creator c's activity on the platform, such as the time of day they are most active or the recency of their posts and interactions.

(6) If available and ethically permissible to use, demographic data like age, location, and interests of both the viewer and creator can be powerful predictors of follow probability.

(7) Social networking features such as the position of both the viewer and the creator within the social network, such as the number of mutual connections or the viewer's centrality within the network.

(8) Content engagement features such as metrics that measure how the viewer v engages with similar content on the platform, like the average time spent on posts, the type of content (video, text, images), and engagement rate.

(9) Content frequency features for creator c such as how often the creator posts new content, as consistent posting can be a key factor in maintaining viewer interest.

(10) Activity level features for viewer v such as how active the viewer v is on the platform, as more active users may be more likely to follow new creators.

The weighted label 404 of each training example may be determined using the $$U_{vc} = \frac{1}{\sqrt{N_v N_c}} \cdot Pr(f_{v \to c})$$

objective function for the corresponding viewer v and creator c pair. Here, $Pr(f_{v \to c})$, $N_v$, and $N_c$ can be observed by tracking and recording follow activity on the social networking system. For example, $Pr(f_{v \to c})$ can be zero if viewer v is not following creator c and one if viewer v is following creator c. Alternatively, the parameter $Pr(f_{v \to c})$ can be a value between [0, 1] representing a likelihood that viewer v follows creator c. The parameter $Pr(f_{v \to c})$ can also incorporate expected post-follow interaction as described above. The parameter $N_v$ can represent a number of follows generated by the viewer v. The parameter $N_c$ can represent a number of follows received by the creator c.

By using weighted labels 404 in the training examples of the training data set 402, the machine learning model 410 (e.g., a deep neural network model) learns during training to deemphasize (down weight) large head creators who tend to be more generic, while emphasizing (upweight) smaller tail creator who tend to have better topical relevance. Similarly, the model 410 learns during training to deemphasize (down weight) viewers who are less selective about the members they follow while emphasizing (upweight) viewers who are more selective. Viewed another way, the weighted labels 404 can be used to avoid neglecting tail creators in the training data set 402 where the training data set 402 is dominated by power users and large head creators.

A machine learning training algorithm 408 is used to train model 410. First, the algorithm 408 initializes by loading the training data set 402. Each example in this dataset has a set of features 406—like interaction history, content similarity, demographic data, etc.—and a weighted label 404 that indicates the known outcome (e.g., whether the viewer followed the creator or not) and its significance based on the weighting scheme.

The training process involves feeding this data into a chosen machine learning model-such as logistic regression, decision trees, or neural networks. The model 410 learns by adjusting its parameters to minimize the difference between its predictions and the actual outcomes in the training data. The weighting of the labels guides the model 410 to pay more attention to certain examples based on their relevance or importance, as determined by the weights.

During training, the algorithm 408 iteratively updates the model 410's parameters. This process involves techniques like gradient descent, where the model 410's errors are used to make gradual adjustments to its parameters. The goal is for the model 410 to reach a state where it can accurately predict the probability of a viewer following a creator based on the input features.

Once training is complete, the model 410's performance is evaluated using a separate validation set to ensure that it generalizes well to new, unseen data. If the model 410 performs satisfactorily, it can then be deployed to predict follow probabilities in real-world scenarios on the social networking system.

Throughout this process, the model 410 learns complex patterns and relationships within the data, enabling it to make informed predictions about viewer and creator pairs based on the learned features and their respective weights.

The normalized or augmenting reciprocal function $$\frac{1}{\sqrt{N_v N_c}}$$

can be used to normalize or augment follow probabilities generated by a trained follow probability machine learning model for viewer, creator pairs as described above in the follow recommendations application. In addition, or alternatively, the reciprocal function can be used to weight follow probabilities in the labels of training examples used to train the following probability machine learning model as described above.

Yet another application of the reciprocal function is applying it to embeddings such as viewer or creator embeddings used as features in training examples used to train the follow probability machine learning model. For example, a viewer embedding for viewer v can be weighted by the value of the reciprocal function $$\frac{1}{\sqrt{N_v}}$$

for viewer v and a creator embedding for creator c can be weighted by the value of the reciprocal function $$\frac{1}{\sqrt{N_c}}$$

for creator c. Here, weighting an embedding may encompass multiplying each numerical element of the embedding by the value of the used reciprocal function.

In all three applications (follow recommendations, weighted training examples, and weighted embeddings), the technical effect of applying the reciprocal function is improvement in the overall health of the follows network of the social networking system with an increased number of follows by selective viewers of tail creators. By doing so, the long-term viewer retention and engagement is consequently improved because more viewers have more meaningful interactions with highly relevant creators.

Example Social Networking System

Figure 5:
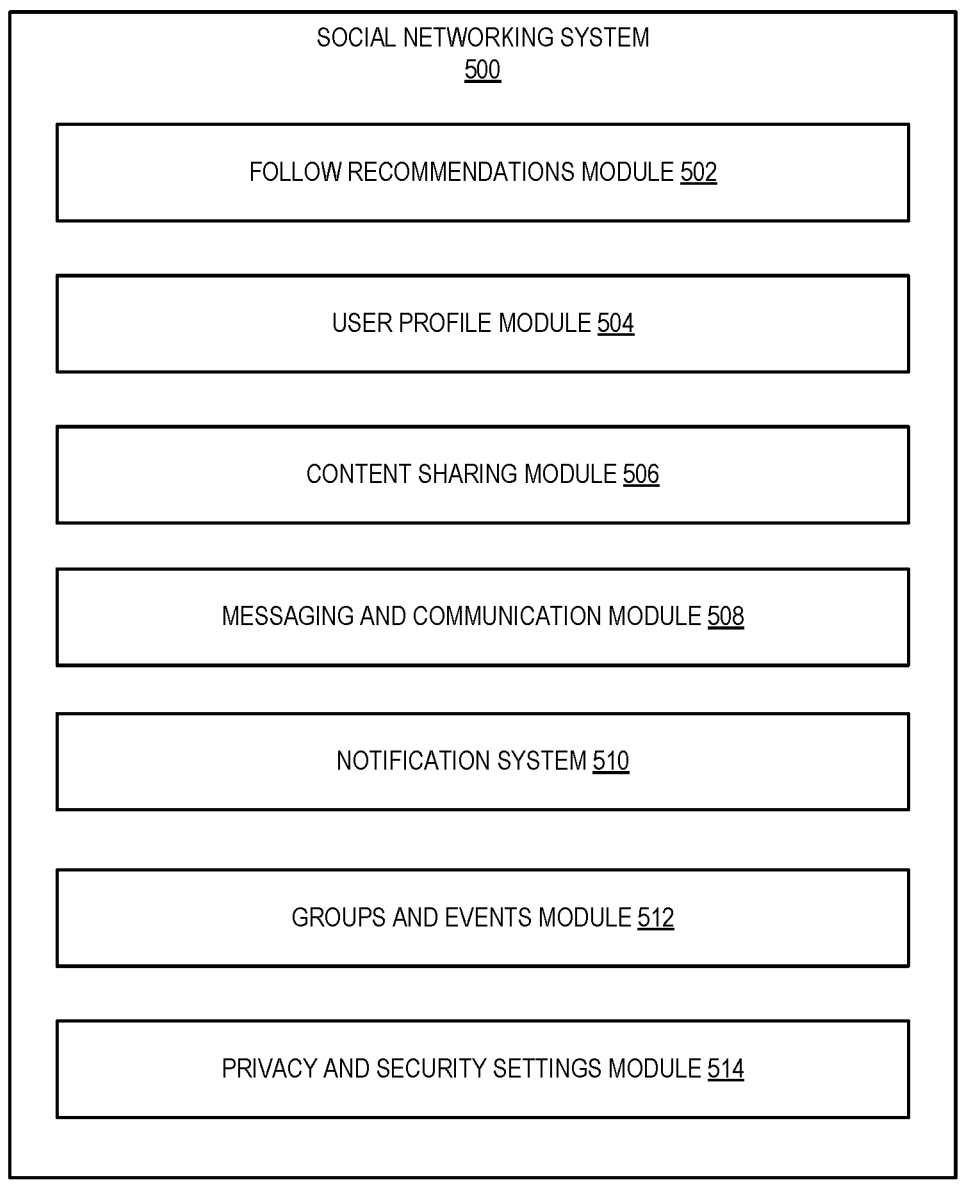
FIG. 5 illustrates an example social networking system for augmented follow probability for social networking system follow recommendations.

FIG. 5 illustrates an example social networking system 500 in which the techniques disclosed herein for augmented follow probability for social networking system follow recommendations are implemented. System 500 is implemented at least in part by one or more programmable electronic devices (e.g., programmable electronic device 600 of FIG. 600) located or housed in one or more data centers or other physical computer hosting facilities. System 500 is connected to a data communications network such as the internet to interact with (e.g., exchange data with) the programmable electronic devices of users.

Social networking system 500 is an online service, platform, or site that focuses on facilitating the building of social networks or social relations among people, business, organizations, and other entities. System 500 allows users to connect with others based on shared interests, backgrounds, real-life connections, or activities. Users create personal profiles where they post various types of content, such as text, photos, and videos, and engage with others through features like messaging, commenting, and liking.

System 500 offers a digital space for individuals to share their experiences, ideas, and thoughts, fostering communication and interaction across diverse communities. In an embodiment, system 500 offers additional functionalities, such as creating groups, organizing events, and discovering content based on user preferences.

System 500 is composed of various modules and components, each serving a distinct function to enhance user experience and interaction. One module of system 500 is the augmented follow probability for social networking system follow recommendations module 502, which utilizes techniques disclosed herein for augmented follow probability for social networking system follow recommendations to suggest other users or pages to follow based on a user's interests, activities, and existing network. In an embodiment, this module analyzes user behavior, such as pages liked, content interacted with, and mutual connections, to generate personalized recommendations.

In addition to augmented follow probability for social networking system follow recommendations module 502 of system 500, system 500 includes any or all of the following modules: user profile module 504, content sharing module 506, messaging and communication module 508, notification system 510, groups and events module 512, privacy and security settings module 514, or any other suitable social network system module.

User profile module 504 allows individuals to create and manage their personal profiles, providing information about themselves and their interests. The user profile module 504 provides a personal space for users to represent themselves and manage their presence on the platform. This module 504 allows users to create and customize their profiles, which act as their digital identity within the network. In an embodiment, the customization includes adding personal information such as name, profile picture, cover photo, and a bio that reflects their personality or interests. In an embodiment, users also share additional details like their location, education, work history, and interests, helping to paint a more comprehensive picture of who they are.

Besides personal information, the profile module 504 enables users to showcase their activities and content on the platform. This includes a timeline or feed of their posts, photos, videos, and shared content, providing a chronological overview of their activity. Users manage the visibility of these elements, controlling who can see their posts and personal information through privacy settings integrated within the module 504.

Additionally, the user profile serves as a hub for social interactions. It allows others to view the user's information, connect by sending friend requests or follows, and engage with the user's content through likes, comments, and shares. In an embodiment, module 504 also includes features like badges or indicators of achievements and activities, further enriching the user's profile.

The content sharing module 506 allows users to post, share, and interact with various types of content like text, images, and videos. This module 506 provides the ability for users to upload different types of media, such as text posts, photos, videos, and links to external content. This module 506 includes user-friendly interfaces for creating and editing posts, with, in an embodiment, tools for adding filters to photos, editing video clips, or formatting text. Once content is shared, it becomes visible to others within the user's network, depending on the user's privacy settings.

Content sharing module 506 also facilitates interaction with this content, allowing viewers to like, comment, and share posts, thus promoting engagement and discussion. In an embodiment, advanced features include tagging other users, adding location data, or incorporating hashtags to categorize content and increase its visibility. Module 506 integrates with the system 500's algorithms to display content in users' feeds based on relevance, recency, and personal preferences. In an embodiment, module 506 provided analytics to users, especially content creators or businesses, offering insights into the reach and engagement of their posts.

The messaging and communication module 508 facilitates private and group conversations, enabling direct and instant communication among users. This module 508 offers a range of functionalities that support both private and group messaging. For private messaging, users send and receive text messages, photos, videos, and links in a one-on-one setting, similar to a traditional Short Message Service (SMS) but with enhanced multimedia capabilities. In an embodiment, this private messaging supports features like read receipts, typing indicators, and the ability to send voice messages. In addition to private conversations, the module 508 includes group messaging capabilities, allowing multiple users to communicate in a single thread. This is particularly useful for coordinating events, discussing common interests, or staying connected with a circle of friends or colleagues.

Additionally, the notification system 510 keeps users informed about activities related to their profile, such as new follows, comments, or likes. The notification system 510 keeps users informed and engaged with the platform's activities. This system 510 functions by sending alerts to users about various interactions and updates related to their profile or content they are interested in. Notifications are triggered by a range of activities, such as when another user likes or comments on their posts, follows their profile, tags them in a photo, or mentions them in a comment. In an embodiment, notifications include alerts about messages received, event reminders, or updates from groups or pages the user follows.

The functionality of notification system 510 is designed to be both informative and non-intrusive. Users have the ability to customize their notification settings, choosing what types of alerts they receive and how they are notified, whether through the platform's interface, email, or mobile push notifications. This customization enhances the user experience by allowing individuals to stay connected with the aspects of the platform they find most relevant, without being overwhelmed by excessive or irrelevant alerts.

In an embodiment, the notification system 510 incorporates smart algorithms to prioritize and sometimes group notifications based on the user's past interactions and preferences. For instance, a user might receive a summarized notification of all the likes on a post instead of separate alerts for each like. This intelligent handling ensures that users are kept up to date with important interactions and events, helping to increase user engagement and encouraging them to interact more frequently with the platform.

For community building, the groups and events module 512 allows the creation and management of interest-based groups and event organization. The module 512 allows users to create, join, and interact within focused communities based on shared interests, causes, or activities. In an embodiment, these groups range from public, open to anyone, to private, where membership requires approval. Within a group, members post content, engage in discussions, share resources, and collaborate on projects or initiatives. Groups have their own set of rules and moderators to ensure a constructive and respectful environment. This feature is instrumental in connecting individuals with common interests and facilitating deeper, topic-centered interactions.

The events feature of module 512 complements the groups features of module 512 by enabling users to create, share, and manage events. Users set up event pages, where they provide details such as date, time, location, and description. These pages become a hub for inviting attendees, sharing updates, and posting event-related content. The module 512 includes tools for RSVPs, allowing both organizers and attendees to track who is planning to attend. In an embodiment, events are public or private, and are linked to specific groups or open to the broader network. This feature is particularly valuable for organizing meetups, workshops, conferences, or social gatherings, providing a seamless way to coordinate and communicate with participants.

Together, the groups and events module 512 enhances the social aspect of the networking platform. It encourages users to engage in more meaningful, interest-based interactions and provides tools for organizing and participating in real-world events, thus bridging the gap between online connections and offline activities.

Lastly, the privacy and security settings module 514 is designed to empower users with control over their personal information and interactions on the platform. This module 514 provides various settings and options that enable users to manage who can view their profile, content, and personal details, as well as who can contact them. Users adjust settings to make their profiles either more public or private, determining the visibility of posts, photos, and friend lists. In an embodiment, users choose to make their content visible to everyone, only to their friends, or to a custom list of specific individuals.

In addition to privacy controls, this module 514, in an embodiment, includes security features aimed at protecting users' accounts from unauthorized access. In an embodiment, this encompasses options like two-factor authentication, where a user must provide two forms of identification before accessing their account, and alerts for login attempts from unfamiliar devices or locations. In an embodiment, users also report suspicious activity and block or report other users who are harassing or spamming them.

Furthermore, the module 514 provides tools for users to manage how their data is collected and used by the platform. This includes settings for opting out of certain types of data collection or controlling how their information is used for advertising purposes. By offering these comprehensive privacy and security options, the module 514 not only safeguards users' personal information and accounts but also enhances their trust and comfort in using the platform, ultimately contributing to a safer and more controlled online environment.

Example Programmable Electronic Device

FIG. 6 illustrates an example of a programmable electronic device that processes and manipulates data to perform techniques disclosed herein for augmented follow probability for social networking system follow recommendations. Example programmable electronic device 600 includes electronic components encompassing hardware or hardware and software including processor 602, memory 604, auxiliary memory 606, input device 608, output device 610, mass data storage 612, and network interface 614, all connected to bus 616. Network 622 is connected to, but not part of, programmable electronic device 600.

While only one of each type of component is depicted in FIG. 6 for the purpose of providing a clear example, multiple instances of any or all these electronic components are present in device 600 in other instances. For example, in an embodiment, multiple processors are connected to bus 616. Accordingly, unless the context clearly indicates otherwise, reference with respect to FIG. 6 to a component of device 600 in the singular such as, for example, processor 602, is not intended to exclude the plural where, in a particular instance of device 600, multiple instances of the electronic component are present. Further, some electronic components might not be present in a particular instance of device 600. For example, device 600 in a headless configuration such as, for example, when operating as a server racked in a data center, might not include, or be connected to, input device 608 or output device 610.

Processor 602 is an electronic component that processes (e.g., executes, interprets, or otherwise processes) instructions 618 including instructions 620 for augmented follow probability for social networking system follow recommendations. In an embodiment, processor 602 fetches, decodes, and executes instructions 618 from memory 604 and performs arithmetic and logic operations dictated by instructions 618 and coordinates the activities of other electronic components of device 600 in accordance with instructions 618. In an embodiment, processor 602 is made using silicon wafers according to a manufacturing process (e.g., 7 nm, 5 nm, or 3 nm). In an embodiment, processor 602 is configured to understand and execute a set of commands referred to as an instruction set architecture (ISA) (e.g., x86, x86_64, or ARM).

In an embodiment, processor 602 includes a cache used to store frequently accessed instructions 618 to speed up processing. In an embodiment, processor 602 has multiple layers of cache (L1, L2, L3) with varying speeds and sizes.

In an embodiment, processor 602 is composed of multiple cores where each such core is a processor within processor 602. The cores allow processor 602 to process multiple instructions 618 at once in a parallel processing manner.

In an embodiment, processor 602 supports multi-threading where each core of processor 602 handles multiple threads (multiple sequences of instructions) at once to further enhance parallel processing capabilities.

In an embodiment, processor 602 is any of the following types of central processing units (CPUs): a desktop processor for general computing, gaming, content creation, etc.; a server processor for data centers, enterprise-level applications, cloud services, etc.; a mobile processor for portable computing devices like laptops and tablets for enhanced battery life and thermal management; a workstation processor for intense computational tasks like 3D rendering and simulations; or any other type of CPU suitable for the particular implementation at hand.

While processor 602 might be a CPU, processor 602, in an embodiment, is any of the following types of processors: a graphics processing unit (GPU) capable of highly parallel computation allowing for processing of multiple calculations simultaneously and useful for rendering images and videos and for accelerating machine learning computation tasks; a digital signal processor (DSP) designed to process analog signals like audio and video signals into digital form and vice versa, commonly used in audio processing, telecommunications, and digital imaging; specialized hardware for machine learning workloads, especially those involving tensors (multi-dimensional arrays); a field-programmable gate array (FPGA) or other reconfigurable integrated circuit that is customized post-manufacturing for specific applications, such as cryptography, data analytics, and network processing; a neural processing unit (NPU) or other dedicated hardware designed to accelerate neural network and machine learning computations, commonly found in mobile devices and edge computing applications; an image signal processor (ISP) specialized in processing images and videos captured by cameras, adjusting parameters like exposure, white balance, and focus for enhanced image quality; an accelerated processing unit (APU) combing a CPU and a GPU on a single chip to enhance performance and efficiency, especially in consumer electronics like laptops and consoles; a vision processing unit (VPU) dedicated to accelerating machine vision tasks such as image recognition and video processing, typically used in drones, cameras, and autonomous vehicles; a microcontroller unit (MCU) or other integrated processor designed to control electronic devices, containing CPU, memory, and input/output peripherals; an embedded processor for integration into other electronic devices such as washing machines, cars, industrial machines, etc.; a system on a chip (SoC) such as those commonly used in smartphones encompassing a CPU integrated with other components like a graphics processing unit (GPU) and memory on a single chip; or any other type of processor suitable for the particular implementation at hand.

Memory 604 is an electronic component that stores data and instructions 618 that processor 602 processes. In an embodiment, memory 604 provides the space for the operating system, applications, and data in current use to be quickly reached by processor 602. In an embodiment, memory 604 is a random-access memory (RAM) that allows data items to be read or written in substantially the same amount of time irrespective of the physical location of the data items inside memory 604.

In an embodiment, memory 604 is a volatile or non-volatile memory. Data stored in a volatile memory is lost when the power is turned off. Data in non-volatile memory remains intact even when the system is turned off. In an embodiment, memory 604 is Dynamic RAM (DRAM). DRAM such as Single Data Rate RAM (SDRAM) or Double Data Rate RAM (DDRAM) is volatile memory that stores each bit of data in a separate capacitor within an integrated circuit. The capacitors of DRAM leak charge and need to be periodically refreshed to avoid information loss. In an embodiment, memory 604 is Static RAM (SRAM). SRAM is volatile memory that is typically faster but more expensive than DRAM. SRAM uses multiple transistors for each memory cell but does not need to be periodically refreshed. Additionally, or alternatively, SRAM is used for cache memory in processor 602 in an embodiment. In an embodiment, memory 604 encompasses both DRAM and SRAM.

Device 600 has auxiliary memory 606 other than memory 604. Examples of auxiliary memory 606 include cache memory, register memory, read-only memory (ROM), secondary storage, virtual memory, memory controller, and graphics memory. In an embodiment, device 600 has multiple auxiliary memories including different types of auxiliary memories.

Cache memory is found inside or very close to processor 602 and is typically faster but smaller than memory 604. Cache memory is used to hold frequently accessed instructions 618 (encompassing any associated data) to speed up processing. In an embodiment, cache memory is hierarchical ranging from Level 1 cache memory which is the smallest but fastest cache memory and is typically inside processor 602 to Level 2 and Level 3 cache memory which are progressively larger and slower cache memories that are inside or outside processor 602.

Register memory is a small but very fast storage location within processor 602 designed to hold data temporarily for ongoing operations.

ROM is a non-volatile memory device that is only read, not written to. In an embodiment, ROM is a Programmable ROM (PROM), Erasable PROM (EPROM), or electrically erasable PROM (EEPROM). In an embodiment, ROM stores basic input/output system (BIOS) instructions which help device 600 boot up.

Secondary storage is a non-volatile memory. In an embodiment, secondary storage encompasses any or all of: a hard disk drive (HDD) or other magnetic disk drive device; a solid-state drive (SSD) or other NAND-based flash memory device; an optical drive like a CD-ROM drive, a DVD drive, or a Blu-ray drive; or flash memory device such as a USB drive, an SD card, or other flash storage device.

Virtual memory is a portion of a hard drive or an SSD that the operating system uses as if it were memory 604. When memory 604 gets filled, less frequently accessed data and instructions 618 is "swapped" out to the virtual memory. The virtual memory is slower than memory 604, but it provides the illusion of having a larger memory 604.

A memory controller manages the flow of data and instructions 618 to and from memory 604. The memory controller is located either on the motherboard of device 600 or within processor 602.

Graphics memory is used by a graphics processing unit (GPU) and is specially designed to handle the rendering of images, videos, graphics, or performing machine learning calculations. Examples of graphics memory include graphics double data rate (GDDR) such as GDDR5 and GDDR6.

Input device 608 is an electronic component that allows users to feed data and control signals into device 600. Input device 608 translates a user's action or the data from the external world into a form that device 600 processes. Examples of input device 608 include a keyboard, a pointing device (e.g., a mouse), a touchpad, a touchscreen, a microphone, a scanner, a webcam, a joystick/game controller, a graphics tablet, a digital camera, a barcode reader, a biometric device, a sensor, and a MIDI instrument.

Output device 610 is an electronic component that conveys information from device 600 to the user or to another device. The information is in the form of text, graphics, audio, video, or other media representation. Examples of output device 610 include a monitor or display device, a printer device, a speaker device, a headphone device, a projector device, a plotter device, a braille display device, a haptic device, a LED or LCD panel device, a sound card, and a graphics or video card.

Mass data storage 612 is an electronic component used to store data and instructions 618. In an embodiment, mass data storage 612 is non-volatile memory. Examples of mass data storage 612 include a hard disk drive (HDD), a solid-state drive (SDD), an optical drive, a flash memory device, a magnetic tape drive, a floppy disk, an external drive, or a RAID array device.

In an embodiment, mass data storage 612 is additionally or alternatively connected to device 600 via network 622. In an embodiment, mass data storage 612 encompasses a network attached storage (NAS) device, a storage area network (SAN) device, a cloud storage device, or a centralized network filesystem device.

Network interface 614 (sometimes referred to as a network interface card, NIC, network adapter, or network interface controller) is an electronic component that connects device 600 to network 622. Network interface 614 functions to facilitate communication between device 600 and network 622. Examples of a network interface 614 include an ethernet adaptor, a wireless network adaptor, a fiber optic adapter, a token ring adaptor, a USB network adaptor, a Bluetooth adaptor, a modem, a cellular modem or adapter, a powerline adaptor, a coaxial network adaptor, an infrared (IR) adapter, an ISDN adaptor, a VPN adaptor, and a TAP/TUN adaptor.

Bus 616 is an electronic component that transfers data between other electronic components of or connected to device 600. Bus 616 serves as a shared highway of communication for data and instructions (e.g., instructions 618), providing a pathway for the exchange of information between components within device 600 or between device 600 and another device. Bus 616 connects the different parts of device 600 to each other. In an embodiment, bus 616 encompasses one or more of: a system bus, a front-side bus, a data bus, an address bus, a control bus, an expansion bus, a universal serial bus (USB), a I/O bus, a memory bus, an internal bus, an external bus, and a network bus.

Instructions 618 are computer-processable instructions that take different forms. In an embodiment, instructions 618 are in a low-level form such as binary instructions, assembly language, or machine code according to an instruction set (e.g., x86, ARM, MIPS) that processor 602 is designed to process. In an embodiment, instructions 618 include individual operations that processor 602 is designed to perform such as arithmetic operations (e.g., add, subtract, multiply, divide, etc.); logical operations (e.g., AND, OR, NOT, XOR, etc.); data transfer operations including moving data from one location to another such as from memory 604 into a register of processor 602 or from a register to memory 604; control instructions such as jumps, branches, calls, and returns; comparison operations; and specialization operations such as handling interrupts, floating-point arithmetic, and vector and matrix operations. In an embodiment, instructions 618 are in a higher-level form such as programming language instructions in a high-level programming language such as Python, Java, C++, etc. In an embodiment, instructions 618 are in an intermediate level form in between a higher-level form and a low-level form such as bytecode or an abstract syntax tree (AST).

Instructions 618 for processing by processor 602 are in different forms at the same or different times. In an embodiment, when stored in mass data storage 612 or memory 604, instructions 618 are stored in a higher-level form such as Python, Java, or other high-level programing language instructions, in an intermediate-level form such as Python or Java bytecode that is compiled from the programming language instructions, or in a low-level form such as binary code or machine code. In an embodiment, when stored in processor 602, instructions 618 are stored in a low-level form such as binary instructions, assembly language, or machine code according to an instruction set architecture (ISA). In an embodiment, instructions 618 are stored in processor 602 in an intermediate level form or even a high-level form where CPU 602 processes instructions in such form.

Instructions 618 are processed by one or more processors of device 600 using a processing model such as any or all of the following processing models: sequential execution where instructions are processed one after another in a sequential manner; pipelining where pipelines are used to process multiple instruction phases concurrently; multiprocessing where different processors different instructions concurrently, sharing the workload; thread-level parallelism where multiple threads run in parallel across different processors; simultaneous multithreading or hyperthreading where a single processor processes multiple threads simultaneously, making it appear as multiple logical processors; multiple instruction issue where multiple instruction pipelines allow for the processing of several instructions during a single clock cycle; parallel data operations where a single instruction is used to perform operations on multiple data elements concurrently; clustered or distributed computing where multiple processors in a network (e.g., in the cloud) collaboratively process the instructions, distributing the workload across the network; graphics processing unit (GPU) acceleration where GPUs with their many processors allow the processing of numerous threads in parallel, suitable for tasks like graphics rendering and machine learning; asynchronous execution where processing of instructions is driven by events or interrupts, allowing the one or more processors to handle tasks asynchronously; concurrent instruction phases where multiple instruction phases (e.g., fetch, decode, execute) of different instructions are handled concurrently; parallel task processing where different processors handle different tasks or different parts of data, allowing for concurrent processing and execution; or any other processing model suitable to meet the requirements of the particular implementation at hand.

Network 622 is a collection of interconnected computers, servers, and other programmable electronic devices that allow for the sharing of resources and information. Network 622 ranges in size from just two connected devices to a global network (e.g., the internet) with many interconnected devices. In an embodiment, network 622 encompasses network devices such as routers, switches, hubs, modems, and access points.

Individual devices on network 622 are sometimes referred to as "network nodes." Network nodes communicate with each other through mediums or channels sometimes referred to as "network communication links." The network communication links are wired (e.g., twisted-pair cables, coaxial cables, or fiber-optic cables) or wireless (e.g., Wi-Fi, radio waves, or satellite links). Network nodes follow a set of rules sometimes referred to "network protocols" that define how the network nodes communicate with each other. Example network protocols include data link layer protocols such as Ethernet and Wi-Fi, network layer protocols such as IP (Internet Protocol), transport layer protocols such as TCP (Transmission Control Protocol), application layer protocols such as HTTP (Hypertext transfer Protocol) and HTTPS (HTTP Secure), and routing protocols such as OSPF (Open Shortest Path First) and BGP (Border Gateway Protocol).

Network 622 has a particular physical or logical layout or arrangement sometimes referred to as a "network topology." Example network topologies include bus, star, ring, and mesh. In an embodiment, network 622 encompasses any or all of the following categories of networks: a personal area network (PAN) that covers a small area (a few meters), like a connection between a computer and a peripheral device via Bluetooth; a local area network (LAN) that covers a limited area, such as a home, office, or campus; a metropolitan area network (MAN) that covers a larger geographical area, like a city or a large campus; a wide area network (WAN) that spans large distances, often covering regions, countries, or even globally (e.g., the internet); a virtual private network (VPN) that provides a secure, encrypted network that allows remote devices to connect to a LAN over a WAN; an enterprise private network (EPN) build for an enterprise, connecting multiple branches or locations of a company; or a storage area network (SAN) that provides specialized, high-speed block-level network access to storage using high-speed network links like Fibre Channel.

Terminology

As used herein and in the appended claims, the term "computer-readable media" refers to one or more mediums or devices that store or transmit information in a format that a computer system accesses. Computer-readable media encompasses both storage media and transmission media. Storage media includes volatile and non-volatile memory devices such as RAM devices, ROM devices, secondary storage devices, register memory devices, memory controller devices, graphics memory devices, and the like. Transmission media includes wired and wireless physical pathways that carry communication signals such as twisted pair cable, coaxial cable, fiber optic cable, radio waves, microwaves, infrared, visible light communication, and the like.

As used herein and in the appended claims, the term "non-transitory computer-readable media" encompasses computer-readable media as just defined but excludes transitory, propagating signals. Data stored on non-transitory computer-readable media isn't just momentarily present and fleeting but has some degree of persistence. For example, instructions stored in a hard drive, a SSD, an optical disk, a flash drive, or other storage media are stored on non-transitory computer-readable media. Conversely, data carried by a transient electrical or electromagnetic signal or wave is not stored in non-transitory computer-readable media when so carried.

As used herein and in the appended claims, unless otherwise clear in context, the terms "comprising," "having," "containing," "including," "encompassing," "in response to," "based on," and the like are intended to be open-ended in that an element or elements following such a term is not meant to be an exhaustive listing of elements or meant to be limited to only the listed element or elements.

Unless otherwise clear in context, relational terms such as "first" and "second" are used herein and in the appended claims to differentiate one thing from another without limiting those things to a particular order or relationship. For example, unless otherwise clear in context, a "first device" could be termed a "second device." The first and second devices are both devices, but not the same device.

Unless otherwise clear in context, the indefinite articles "a" and "an" are used herein and in the appended claims to mean "one or more" or "at least one." For example, unless otherwise clear in context, "in an embodiment" means in at least one embodiment, but not necessarily more than one embodiment. Accordingly, unless otherwise clear in context, phrases such as "a device configured to" are intended to include one or more recited devices. Such one or more recited devices, unless otherwise clear in context, are collectively configured to carry out the stated recitations. For example, "a processor configured to carry out recitations A, B and C" encompasses both (a) a single processor configured to carry out recitations A, B, and C and (b) a first processor configured to carry out recitation A working in conjunction with a second processor configured to carry out recitations B and C.

Unless otherwise clear in context, the terms "set," and "collection" should generally be interpreted to include one or more described items throughout this application. Accordingly, unless otherwise clear in context, phrases such as "a set of devices configured to" or "a collection of devices configured to" are intended to include one or more recited devices. Such one or more recited devices, unless otherwise clear in context, are collectively configured to carry out the stated recitations. For example, "a set of servers configured to carry out recitations A, B and C" encompasses both (a) a single server configured to carry out recitations A, B, and C and (b) a first server configured to carry out recitations A and B working in conjunction with a second server configured to carry out recitation C.

As used herein, unless otherwise clear in context, the term "or" is open-ended and encompasses all possible combinations, except where infeasible. For example, if it is stated that a component includes A or B, then, unless infeasible or otherwise clear in context, the component includes at least A, or at least B, or at least A and B. As a second example, if it is stated that a component includes A, B, or C then, unless infeasible or otherwise clear in context, the component includes at least A, or at least B, or at least C, or at least A and B, or at least A and C, or at least B and C, or at least A and B and C.

Unless the context clearly indicates otherwise, conjunctive language in this description and in the appended claims such as the phrase "at least one of X, Y, and Z," is to be understood to convey that an item, term, etc. is either X, Y, or Z, or a combination thereof. Thus, such conjunctive language does not require that at least one of X, at least one of Y, and at least one of Z to each be present.

Unless the context clearly indicates otherwise, the relational term "based on" is used in this description and in the appended claims in an open-ended fashion to describe a logical (e.g., a condition precedent) or causal connection or association between two stated things where one of the things is the basis for or informs the other without requiring or foreclosing additional unstated things that affect the logical or casual connection or association between the two stated things.

Unless the context clearly indicates otherwise, the relational term "in response to" or "responsive to" is used in this description and in the appended claims in an open-ended fashion to describe a stated action or behavior that is done as a reaction or reply to a stated stimulus without requiring or foreclosing additional unstated stimuli that affect the relationship between the stated action or behavior and the stated stimulus.

Privacy

In an embodiment, the techniques described herein are implemented with privacy safeguards to protect user privacy. Furthermore, in an embodiment, the techniques described herein are implemented with user privacy safeguards to prevent unauthorized access to personal data and confidential data. The training of the artificial intelligence ("AI") models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, in an embodiment, users have full control over the visibility of their content and who sees their content, as is controlled via the visibility settings. According to the techniques described herein, in an embodiment, users have full control over the level of their personal data that is shared and distributed between different AI platforms that provide different functionalities. According to the techniques described herein, in an embodiment, users have full control over the level of access to their personal data that is shared with other parties. According to the techniques described herein, personal data provided by users is, in an embodiment, processed to determine prompts when using a generative AI feature at the request of the user, but not to train generative AI models. In some embodiments, users provide feedback while using the techniques described herein, which are used to improve or modify the platform and products. In some embodiments, any personal data associated with a user, such as personal information provided by the user to the platform, is deleted from storage upon user request. In some embodiments, personal information associated with a user is permanently deleted from storage when a user deletes their account from the platform.

According to the techniques described herein, personal data is, in an embodiment, removed from any training dataset that is used to train AI models. The techniques described herein, in an embodiment, utilize tools for anonymizing member and customer data. For example, user's personal data is, in an embodiment, redacted and minimized in training datasets for training AI models through delexicalisation tools and other privacy enhancing tools for safeguarding user data. The techniques described herein, in an embodiment, minimize use of any personal data in training AI models, including removing and replacing personal data.

According to the techniques described herein, notices are, in an embodiment, communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices are provided to users when AI tools are being used to provide features.

What is claimed is:

1. A method comprising:
   determining a first number of follows generated by a first member in a social networking system;
   determining a second number of follows received by a second member in the social networking system;
   determining a third number of follows received by a third member in the social networking system;
   determining a first weighted follow utility score for a first member pair comprising the first member and the second member; wherein the first weighted follow utility score is determined using a follow probability machine learning model, wherein the follow probability machine learning model is trained using viewer embeddings and creator embeddings, wherein the viewer embeddings are weighted based on numbers of follows generated by viewers of content in the social networking system and the creator embeddings are weighted based on numbers of follows received by creators of content in the social networking system;
   determining a second weighted follow utility score for a second member pair comprising the first member and the third member; wherein the second weighted follow utility score is determined using the follow probability machine learning model;
   determining a ranking of at least the first member pair and the second member pair based on the first weighted follow utility score and the second weighted follow utility score;
   determining a recommendation that the first member follow at least the third member based on the ranking; and
   causing the recommendation to be displayed at a programmable electronic device.

2. The method of claim 1, further comprising:
   determining the first weighted follow utility score based on an inverse of a geometric mean of the first number of follows generated by the first member and the second number of follows received by the second member; and
   determining the second weighted follow utility score based on the inverse of the geometric mean of the first number of follows generated by the first member and the third number of follows received by the third member.

3. The method of claim 1, further comprising:
   training the follow probability machine learning model based on a training data set comprising a set of one or more training examples; wherein each training example of the set of one or more training examples corresponds to a respective viewer-creator pair; wherein each training example of the set of one or more training examples comprises a respective label; wherein the respective label comprises a respective weighted follow probability for the respective viewer-creator pair; and wherein the respective weighted follow probability is weighted based on a number of follows generated by a respective viewer in the social networking system and a number of follows received by a respective creator in the social networking system.

4. The method of claim 1, wherein the recommendation displayed at the programmable electronic device does not recommend that the first member follow the second member.

5. The method of claim 1, wherein the first weighted follow utility score and the second weighted follow utility score indicate that the first member is more likely to follow the second member than the third member; and wherein the second member pair is ranked higher in the ranking that the first member pair.

6. A non-transitory computer-readable medium storing instructions which, when executed by at least one programmable electronic device, cause the at least one programmable electronic device to perform operations comprising:
   determining a first number of follows generated by a first member in a social networking system;
   determining a second number of follows received by a second member in the social networking system;
   determining a third number of follows received by a third member in the social networking system;
   determining a first weighted follow utility score for a first member pair comprising the first member and the second member; wherein the first weighted follow utility score is determined using a follow probability machine learning model, wherein the follow probability machine learning model is trained using viewer embeddings and creator embeddings, wherein the viewer embeddings are weighted based on numbers of follows generated by viewers of content in the social networking system and the creator embeddings are weighted based on numbers of follows received by creators of content in the social networking system;
   determining a second weighted follow utility score for a second member pair comprising the first member and the third member; wherein the second weighted follow utility score is determined using the follow probability machine learning model;
   determining a ranking of at least the first member pair and the second member pair based on the first weighted follow utility score and the second weighted follow utility score;
   determining a recommendation that the first member follow at least the third member based on the ranking; and
   causing the recommendation to be displayed at a programmable electronic device.

7. The non-transitory computer-readable medium of claim 6, the operations further comprising:
   determining the first weighted follow utility score based on an inverse of a geometric mean of the first number of follows generated by the first member and the second number of follows received by the second member; and
   determining the second weighted follow utility score based on the inverse of the geometric mean of the first number of follows generated by the first member and the third number of follows received by the third member.

8. The non-transitory computer-readable medium of claim 6, the operations further comprising:
   using a trained follow probability machine learning model to determine the first weighted follow utility score for the first member pair; and using the trained follow probability machine learning model to determine the second weighted follow utility score for the second member pair.

9. The non-transitory computer-readable medium of claim 8, the operations further comprising:
training the follow probability machine learning model based on a training data set comprising a set of one or more training examples; wherein each training example of the set of one or more training examples corresponds to a respective viewer-creator pair; wherein each training example of the set of one or more training examples comprises a respective label; wherein the respective label comprises a respective weighted follow probability for the respective viewer-creator pair; and wherein the respective weighted follow probability is weighted based on a number of follows generated by the respective viewer in the social networking system and a number of follows received by the respective creator in the social networking system.

10. The non-transitory computer-readable medium of claim 9, the operations further comprising:
weighting viewer embeddings of the training data set based on numbers of follows generated by viewers in the social networking system; and
weighting creator embeddings of the training data set based on numbers of follows received by creators in the social networking system.

11. The non-transitory computer-readable medium of claim 6, wherein the recommendation displayed at the programmable electronic device does not recommend that the first member follow the second member.

12. The non-transitory computer-readable medium of claim 6, wherein the first weighted follow utility score and the second weighted follow utility score indicate that the first member is more likely to follow the second member than the third member; and wherein the second member pair is ranked higher in the ranking that the first member pair.

13. A system comprising:
at least one processor;
memory; and
instructions stored in the memory to be executed by the at least one processor for:
determining a first number of follows generated by a first member in a social networking system;
determining a second number of follows received by a second member in the social networking system;
determining a third number of follows received by a third member in the social networking system;
determining a first weighted follow utility score for a first member pair comprising the first member and the second member; wherein the first weighted follow utility score is determined using a follow probability machine learning model, wherein the follow probability machine learning model is trained using viewer embeddings and creator embeddings, wherein the viewer embeddings are weighted based on numbers of follows generated by viewers of content in the social networking system and the creator embeddings are weighted based on numbers of follows received by creators of content in the social networking system;
determining a second weighted follow utility score for a second member pair comprising the first member and the third member; wherein the second weighted follow utility score is determined using the follow probability machine learning model;
determining a ranking of at least the first member pair and the second member pair based on the first weighted follow utility score and the second weighted follow utility score;
wherein the first weighted follow utility score and the second weighted follow utility score indicate that the first member is more likely to follow the second member than the third member;
wherein the second member pair is ranked higher in the ranking that the first member pair;
determining a recommendation that the first member follow at least the third member based on the ranking; and
causing the recommendation to be displayed at a programmable electronic device.

14. The system of claim 13, further comprising:
instructions stored in the memory to be executed by the at least one processor for:
determining the first weighted follow utility score based on an inverse of a geometric mean of the first number of follows generated by the first member and the second number of follows received by the second member; and
determining the second weighted follow utility score based on the inverse of the geometric mean of the first number of follows generated by the first member and the third number of follows received by the third member.

15. The system of claim 13, further comprising:
instructions stored in the memory to be executed by the at least one processor for:
using a trained follow probability machine learning model to determine the first weighted follow utility score for the first member pair; and
using the trained follow probability machine learning model to determine the second weighted follow utility score for the second member pair.

16. The system of claim 15, further comprising:
instructions stored in the memory to be executed by the at least one processor for:
training the follow probability machine learning model based on a training data set comprising a set of one or more training examples; wherein each training example of the set of one or more training examples corresponds to a respective viewer-creator pair; wherein each training example of the set of one or more training examples comprises a respective label; wherein the respective label comprises a respective weighted follow probability for the respective viewer-creator pair; and wherein the respective weighted follow probability is weighted based on a number of follows generated by the respective viewer in the social networking system and a number of follows received by the respective creator in the social networking system.

17. The system of claim 16, further comprising:
instructions stored in the memory to be executed by the at least one processor for:
weighting viewer embeddings of the training data set based on numbers of follows generated by viewers in the social networking system; and
weighting creator embeddings of the training data set based on numbers of follows received by creators in the social networking system.

18. The system of claim 13, wherein the recommendation displayed at the programmable electronic device does not recommend that the first member follow the second member.

\* \* \* \* \*